United States Patent [19]

Smith et al.

[11] E Re. 31,349

[45] Reissued Aug. 16, 1983

[54] LUBRICATED METALLIC CONTAINER STOCKS AND METHOD OF PREPARING THE SAME AND APPLYING ORGANIC COATING THERETO

[75] Inventors: John R. Smith, Richmond; James A. Bray, Salineville, both of Ohio

[73] Assignee: National Steel Corporation, Pittsburgh, Pa.

[21] Appl. No.: 211,130

[22] Filed: Nov. 28, 1980

Related U.S. Patent Documents

Reissue of:

[64] Patent No.: 3,826,675
Issued: Jul. 30, 1974
Appl. No.: 233,748
Filed: Mar. 10, 1972

[51] Int. Cl.[3] ..... B32B 15/18; B32B 15/20

[52] U.S. Cl. ..... 428/623; 413/18; 413/19; 148/6; 148/6.3; 204/37 T; 252/56 R; 252/56 S; 427/388.1; 427/409; 427/421; 428/35; 428/411; 428/457; 428/467; 206/524.3

[58] Field of Search ..... 252/56 R, 56 S; 428/35, 428/411, 457, 467, 542, 624, 623, 626; 148/6, 6.3; 204/37 T; 113/120 A, 120 XY; 427/409, 421, 388.1; 206/524.3

[56] References Cited

U.S. PATENT DOCUMENTS

| | | | |
|---|---|---|---|
| 1,993,737 | 3/1935 | DeWitt et al | 252/565 |
| 1,993,738 | 3/1935 | DeWitt | 252/565 |
| 2,146,885 | 2/1939 | Dempsey | 428/374 |
| 2,370,300 | 2/1945 | Farrington | 252/56 R |
| 2,503,217 | 4/1950 | Brust | 204/37 |
| 2,573,882 | 11/1951 | Waters | 427/313 |
| 2,573,883 | 11/1951 | Waters | 427/311 |
| 2,579,777 | 12/1951 | Allen | 427/354 |
| 2,579,778 | 12/1951 | Allen | 427/354 |
| 2,666,716 | 1/1954 | Kadell | 428/467 |
| 2,884,338 | 4/1959 | Jenison | 428/624 |
| 2,918,390 | 12/1956 | Brown | 428/457 |
| 3,057,892 | 10/1962 | DeGroote | 252/565 |
| 3,058,913 | 10/1962 | Koch | 252/565 |

FOREIGN PATENT DOCUMENTS 438214 11/1948 Canada .

*Primary Examiner*—Ellis P. Robinson
*Attorney, Agent, or Firm*—Paul T. O'Neil

[57] ABSTRACT

Metallic container stocks are lubricated with citric acid esters. The improved lubricated container stocks of the invention are characterized by excellent wettability and adhesion of organic coatings in general and especially epoxy resin coating compositions. The citric acid ester lubricants are pharmacologically safe and are easily applied at low cost by electrostatic deposition and other methods presently used for applying prior art lubricating agents. The method of the invention is especially useful in lubricating tinplate strip, blackplate strip, blackplate strip having a chromium-containing coating thereon, and aluminum strip of container stock gauge with citric acid ester lubricants having the following structural formula:

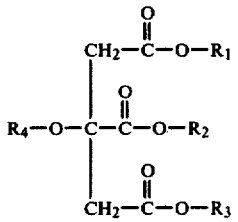

wherein $R_1$, $R_2$ and $R_3$ are individually selected from the group consisting of hydrogen and alcoholic residual containing 1–18 carbon atoms, $R_4$ is selected from the group consisting of hydrogen and carboxylic acid radicals containing 1–18 carbon atoms, and at least one of $R_1$, $R_2$ and $R_3$ is an alcoholic residue. The invention further provides a novel method of applying an organic coating on lubricated metallic container stocks.

21 Claims, No Drawings

LUBRICATED METALLIC CONTAINER STOCKS AND METHOD OF PREPARING THE SAME AND APPLYING ORGANIC COATING THERETO

Matter enclosed in heavy brackets [ ] appears in the original patent but forms no part of this reissue specification; matter printed in italics indicates the additions made by reissue.

BACKGROUND OF THE INVENTION

The present invention broadly relates to improved lubricated metallic container stocks and to a novel method of preparing the same. In still another of its aspects, the invention further relates to a novel method of applying an organic coating on lubricated metallic container stocks.

A thin coating of a lubricant is applied on the surfaces of most metallic container stocks produced in this country. The lubricant is necessary in order to facilitate handling of sheets of the product and to protect the surfaces against abrasion, scratches, and to some extent corrosion. If the lubricant is not applied, the individual sheets tend to stick together and do not handle well in subsequent fabricating steps utilizing automatic machines for applying organic coatings, lithographing and manufacturing containers.

The amount of lubricant that is applied is quite small and must be maintained within a relatively narrow critical range. If too little lubricant is applied, then the disadvantages enumerated above when no lubricant is applied are present to some extent. If too much lubricant is applied, there is excessive slippage and it is difficult to stack and handle the individual sheets. Excess oil may also adversely affect the application of organic coatings, lithographing, labeling and other subsequent steps. The lubricant usually should be applied in an amount of about 0.05–1.0 gram per base box. The term "base box" is used in this art to refer to a quantity of metallic container stock having a total surface area, i.e., the surface area of both sides, of 62,720 square inches. The term "base box" is used hereinafter for convenience in disclosing and claiming the invention and refers to a total surface area of 62,720 square inches on which the lubricant is applied.

Lubricants may be applied to metallic container stock by a number of methods such as branning, dipping in a solvent solution of the lubricant followed by evaporating the solvent, and electrostatic deposition. Electrostatic deposition is a method that is suitable for the application of the small quantities of lubricant set out above in the form of a thin uniform film at high line speeds. The line speeds employed in the manufacture of metallic container stocks sometimes vary from 250 feet per minute to as high as 2,000 feet per minute and a method capable of control of the rate of lubricant application for these line speed variations is required. As a result, the lubricant that is selected for commercial use should be capable of being applied by electrostatic deposition.

A lubricant for lubricating metallic container stocks should possess a unique combination of properties. If any one of this combination of properties is missing, then the lubricant is not entirely satisfactory. As a result, only a very small percentage of the numerous potential lubricants are satisfactory. The problem of selecting a suitable lubricant is complicated by the fact that it is often impossible to predict whether or not a specific substance will be suitable by laboratory scale lubricating experiments and the potential lubricant must be applied in a production run.

Some of the more important characteristics of an entirely satisfactory lubricant for metallic container stocks are as follows:

(1) In the case of electrostatic deposition, the lubricant should be easily atomized to form a finely divided dispersion thereof in a gaseous medium such as air. A carefully controlled quantity of the suspended particles of lubricant in the resultant gaseous dispersion should be capable of being electrostatically precipitated in the form of a thin uniform film upon metallic container stock moving at high line speeds.

(2) The lubricant should be retained on the container stock for a reasonable period of time in an amount effective to lubricate the surface.

(3) The lubricant should be compatible with protective and/or decorative organic coatings which are subsequently applied to the lubricated container stock. The lubricant also should have no effect or a beneficial effect on the wetting of the surface area to be coated and the adhesion thereto of the protective and/or decorative organic coatings.

(4) The lubricant should not be discolored upon heating or baking the lubricated container stock at a temperature sufficiently high to harden or cure the organic coatings.

(5) The film of lubricant should be resistant to oxidation and not harden or lose its desirable lubricant properties over a reasonable period of time.

(6) The lubricant should be free of objectionable tastes and odors in the quantities applied and under the conditions of use.

(7) The lubricant must be pharmacologically safe and nontoxic in the amounts applied as the lubricated container stocks are often used to manufacture containers for preserving and storing foodstuffs.

A number of naturally occurring vegetable oils and synthetic esters of carboxylic acids have been proposed heretofore for use in lubricating metallic container stocks. Vegetable oils such as cotton seed oil, palm oil and the like have a tendency to oxidize to a solid film which is no longer a good lubricant after a relatively short period of storage. A number of the synthetic ester lubricants have this deficiency, and as a result of this and other advantages, several of the esters of sebacic acid have been used heretofore as lubricants. Synthetic esters of sebacic acid prepared from alcohols containing eight or more carbon atoms, such as dioctyl sebacate, are widely used as lubricants at the present time. While dioctyl sebacate is one of the best synthetic ester lubricants available heretofore, it does have some deficiencies in view of recent developments in the art. For example, a substantial percentage of the metallic container stock produced in this country is given a cathodic dichromate treatment such as disclosed in U.S. Pats. No. 3,278,401 and 3,296,106. The cathodic dichromate treatment increases corrosion resistance and is desirable for this purpose. When the cathodic dichromate treated container stock is lubricated with dioctyl sebacate or other prior art lubricants, wetting or eyeholing problems often occur. This tendency is especially pronounced when epoxy type lacquers and certain other advanced organic coatings are used. As a result of this deficiency, the art has long sought a suitable lubricant which meets all of the requirements set out above, regardless of the type of organic coating and whether or not the container stock has received a cathodic dichromate treatment. However, an entirely satisfactory lubricant was not available prior to the present invention.

It is an object of the present invention to provide an improved lubricated metallic container stock which is readily wetted by initially fluid organic coating materials which often present wetting problems such as epoxy lacquers.

It is a further object to provide a novel method of lubricating metallic container stocks wherein the lubricant is an ester of citric acid.

It is still a further object to provide a novel method of applying an organic coating on lubricated container stocks wherein the lubricated surface area to be coated is easily wetted by initially fluid organic coating materials and whereby eyeholing and other imperfections in the final hardened organic coating may be minimized.

Still other objects and advantages of the present invention will be apparent to those skilled in the art upon reference to the following detailed description.

DETAILED DESCRIPTION OF THE INVENTION INCLUDING PREFERRED EMBODIMENTS AND VARIANTS THEREOF

The present invention provides improved metallic container stock having a thin substantially uniform film of a citric acid ester lubricant on at least one surface area thereof. The citric acid ester lubricant is present in an amount to lubricate the surface area and preferably is present in an amount of about 0.05–1.0 gram per base box, i.e., about 0.05–1.0 gram for each 62,720 square inches of lubricated surface area. In instances where the lubricated container stock is to receive an organic coating in a subsequent processing step, then usually better results are obtained when citric acid ester lubricant is present in an amount of about 0.15–0.40 gram per base box.

Citric acid ester lubricants for use in practicing the invention may have the following structural formula:

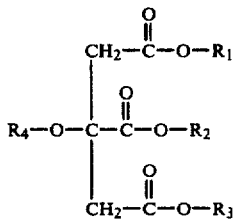

wherein $R_1$, $R_2$ and $R_3$ are individually selected from the group consisting of hydrogen and alcoholic residua containing 1–18 carbon atoms, $R_4$ is selected from the group consisting of hydrogen and carboxylic acid radicals containing 1–18 carbon atoms, and at least one of $R_1$, $R_2$ and $R_3$ is an alcoholic residue. In some instances, it is prefered that $R_1$, $R_2$ and/or $R_3$ be alcoholic residua containing 1–10 and often for better results 1–4 carbon atoms, and/or that $R_4$ be selected from the group consisting of hydrogen and carboxylic acid radicals containing 1–10 and often for better results 1–4 carbon atoms. In other instances, it is preferred that each of $R_1$, $R_2$ and $R_3$ be alcoholic residua containing 1–10 and preferably 1–4 carbon atoms, and/or that $R_4$ be either hydrogen or a carboxylic acid radical containing 1–10 and preferably 1–4 carbon atoms.

Specific examples of presently preferred citric acid ester lubricants include triethyl citrate, acetyl triethyl citrate, tributyl citrate, acetyl tributyl citrate, acetyl tri-2-ethylhexyl citrate, and admixtures of one or more thereof. Acetyl tributyl citrate often gives the best results.

Any suitable prior art metallic container stock may be lubricated with the citric acid ester lubricants of the invention. Usually tinplate, blackplate, blackplate having a chromium-containing coating thereon and metallic aluminum of container stock gauge are the preferred container stocks. Metallic container stocks are usually in the form of sheet or continuous strip, but may be in other shapes convenient for use in the manufacture of containers. Container stocks suitable for use in practicing the invention are disclosed in numerous texts and U.S. patents. For example, blackplate and tinplate are disclosed in "The Making, Shaping and Treating of Steel," 7th edition, published by the United States Steel Corporation and aluminum container stocks are disclosed in the text "Aluminum," published by the American Society for Metals, of which chaper 23 in volume 3, is the most pertinent. Blackplate having a chromium-containing coating thereon is disclosed in Pats. No. 3,316,160, 3,526,486, 3,567,599, and 3,475,295. Pat. No. 3,526,486 discloses blackplate having a metallic chromium-containing coating thereon contiguous with the ferrous metal surface and a nonmetallic chromium-containing film thereover which is cathodically deposited from an aqueous hexavalent chromium electrolyte. The disclosures in the above texts and patents are incorporated herein by reference.

The metallic container stocks to be lubricated may be given an electrochemical treatment in an aqueous electrolyte containing a water soluble chromium compound to deposit a chromium-containing film thereon which increases corrosion resistance. U.S. Pat. No. 3,278,401 discloses a method of electrochemically depositing a chromium-containing film on tinplate, which preferably but not necessarily is flow brightened electrolytic tinplate. The chromium-containing film is cathodically deposited on the tinplate from an aqueous hexavalent chromium electrolyte. Cathodic dichromate treatment is usually preferred. Pat. No. 3,296,106 discloses the treatment of various metallic substrates to electrochemically deposit thereon a chromium-containing film which increases corrosion resistance. The metallic substrates are cathodically treated in an aqueous hexavalent chromium electrolyte and the treatment is effective for blackplate, iron tin alloy coated ferrous metal, tinplate and other metallic container stocks. The deposition of a nonmetallic chromium-containing film on blackplate coated with metallic chromium is disclosed in Pat. No. 3,526,486. The teachings of the above patents are likewise incorporated herein by reference. It is understood that the metallic container stocks may be given an electrochemical treatment such as described therein, or other prior art treatments, for the purpose of increasing corrosion resistance or for imparting other desirable properties prior to applying the lubricant.

The products produced in accordince with the teachings of U.S. Pats. No. 3,278,401 and 3,526,486 are especially desirable metallic container stocks and thus are often preferred. The citric acid ester lubriants are especially effective with these substrates.

Any suitable prior art method for lubricating metallic container stock may be used for applying the citric acid ester lubricant in the form of a thin substantially uniform film. Examples of prior art methods include electrostatic deposition, branning, applying a solution of the lubricant in a volatile solvent followed by evaporating the solvent, applying an aqueous emulsion of the lubricant followed by evaporating the water, and applying the lubricant per se directly to the container stock by means of metering rolls, spraying or the like when it is sufficiently fluid. Electrostatic deposition is usually the preferred method of application in the commercial production of metallic container stocks. The citric acid esters described herein are easily applied by electrostatic deposition and have the desirable characteristics enumerated hereinbefore. Additionally, the synthetic citric acid esters enhance wettability of the lubricated surface by the initially fluid organic coating and reduce surface imperfections such as eyeholing. Adhesion is also improved and the final hardened or cured organic coatings produced in accordance with the coating method of the invention exhibit excellent adherence. These beneficial effects extend to container stocks which have received an electrochemical treatment prior to applying the lubricant. Cathodic dichromate treatment of tinplate and other metallic substrates often tends to introduce wetting problems. This problem may be eliminated by using the citric acid ester lubricants.

In practicing the organic coating method of the present invention, any suitable prior art fluid organic coating material may be used such as varnishes, lacquers and enamels for metallic container stocks. Specific examples of organic coating materials include epoxy, modified epoxy, phenolic, modified phenolic, acrylic, modified acrylic, vinyl, modified vinyl, alkyd and polyurethane varnishes, lacquers and/or enamels. Prior art lithographing or printing inks which are suitable for use on metallic container stocks for labeling and decorative purposes are considered to be organic coatings for the purpose of the present invention. The organic coating materials should be fluid initially, i.e., sufficiently fluid to be applied by metering rolls, spraying, brushing, and direct or indirect printing or lithographing; and may vary from soft pastes to fluid liquids depending upon the selected method of application. The initially fluid organic coating material is hardened or cured following application by, for example, evaporating solvent or baking to produce the final organic coating. The method of applying the initially fluid organic coating material and then hardening the same to produce the final organic coating may be in accordance with prior are practice. However, the metallic container stock to be coated must be lubricated with a citric acid ester of the present invention. The citric acid ester lubricant assures substantially instantaneous wetting of the surface by the initially fluid organic coating material and allows high speed coating lines to be employed with all organic coating materials including those which tend toward poor wetting properties. Additionally, the hardened or cured organic coating tends to adhere more tightly to the citric acid ester lubricated surface and any tendency toward poor adherence is overcome and eyeholing or other imperfections are not a problem. Thus, the present invention overcomes the problems of the prior art when operating high speed coating lines and especially when using organic coating compositions which normally present wetting problems.

The foregoing detailed description of the invention and the following specific examples are for purposes of illustration only and are not intended as being limiting to the spirit or scope of the appended claims.

EXAMPLE I

Tinplated strip delivered from a prior art electrolytic tinplating line at a strip speed above 1,000 feet per minute is passed continuously through a flow brightening zone where it is flow brightened, followed by quenching with water and a cathodic dichromate treatment in accordance with U.S. Pat. No. 3,278,401. The resulting cathodic dichromate treated flow brightened tinplate is rinsed, dried and passed through an electrostatic lubricating zone at a speed corresponding to the speed of the tinplating line. Acetyl tributyl citrate was atomized to form a finely divided gaseous suspension, and the gaseous suspension was passed through an ionizing zone where the suspended particles of acetyl tributyl citrate lubricant were given an electrical charge. A stream of the gaseous suspension of ionized lubricant particles was directed toward and electrostatically precipitated on the electrically grounded moving strip in the form of a thin uniform film. The lubricated tinplate withdrawn from the electrostatic lubricating zone had 0.26 gram per base box of acetyl tributyl citrate on the surface.

The lubricated flow brightened tinplated strip was sheared into sheets. The lubricated tinplate sheets handled well in automatic equipment without undue abrasion or scratching and the product was used in the Examples appearing hereinafter.

EXAMPLE II

A second run was made in accordance with Example I with the exception of substituting dioctyl sebacate as the lubricant for the acetyl tributyl citrate. The resulting product had 0.27 gram per base box of dioctyl sebacate lubricant on the sheet surfaces.

EXAMPLE III

Samples of lubricated tinplate from Example I and Example II were stored for four months under identical conditions to determine the amount of lubricant lost during the period of storage.

The product of Example I initially had 0.26 gram per base box of acetyl tributyl citrate on its surface, and after four months of storage 0.20 gram per base box. The product of Example II initially had 0.27 gram per base box of dioctyl sebacate on its surface, and only 0.17 gram per base box after four months of storage. It is therefore apparent that the rate of loss of acetyl tributyl citrate during storage is substantially less than that of dioctyl sebacate. This is an unexpectedly low rate of loss of acetyl tributyl citrate since dioctyl sebacate is considered to be very outstanding in this respect.

EXAMPLE IV

Samples of lubricated tinplate from Example I and from Example II were tested under identical conditions with diluted lacquers to determine the effect of the two lubricants on wetting. One part of the lacquer was mixed with six parts of solvent and one drop of the resulting mixture was applied to the surface of a tinplate sample from each of Examples I and II laid horizontally on a flat level surface. The drops of diluted lacquer were allowed to dry in air, and then baked for a permanent record. The area of flow of each system was measured in square inches and the results recorded.

In one run, one part by volume of epoxy lacquer was diluted with six volumes of isophorone and the mixture was tested as set out above. This mixture gave an area of flow of 0.24 square inch for the dioctyl sebacate oiled tinplate, and 2.4 square inches for the acetyl tributyl citrate oiled tinplate.

In another run, one part of epoxy lacquer was diluted with six parts of diacetone alcohol and the mixture was tested as set out above. The dioctyl sebacate oiled tinplate had an area of flow of 0.17 square inch and the acetyl tributyl citrate oiled tinplate had an area of flow of 0.95 square inch.

In a further run, one part of epoxy lacquer was diluted with six volumes of ethylene glycol monoethyl ether acetate and the mixture was tested as set out above. The dioctyl sebacate oiled tinplate had an area of flow of 0.62 square inch, and the acetyl tributyl citrate oiled tinplate had an area of flow of 2.1 square inches.

In a further run, one part of epoxy lacquer was diluted with six parts of ethylene glycol monoethyl ether and the mixture was tested as set out above. The dioctyl sebacate oiled tinplate had an area of flow of 0.6 square inch, and the acetyl tributyl citrate oiled tinplate had an area of flow of 1.9 square inches.

It is clear from the above data that the acetyl tributyl citrate oiled tinplate was much more easily wetted by the various diluted epoxy lacquers than the dioctyl sebacate oiled tinplate.

EXAMPLE V

Individual runs were made using the lubricated product from Example I and the lubricated product from Example II in a high speed line for lacquering and lithographing the sheets. The organic coating, which was used in both runs, was an epoxy lacquer which exhibited a tendency toward eyeholding and poor wetting.

No problems were experienced with respect to eyeholing and wetting when the lubricated product of Example I, i.e., the acetyl tributyl citrate lubricated tinplate was being run. However, the lubricated product of Example II, i.e., the dioctyl sebacate lubricated tinplate exhibited eyeholding and wetting problems and was not satisfactory in these respects. The hardened film of epoxy lacquer on the product of Example I was also more adherent than on the product of Example II.

Upon making further runs identical with those of Examples I through V above with respect to the oiling step, except for substituting blackplate, blackplate having a chromium-containing coating and aluminum sheet for the tinplate of Examples I through V in the oiling step, comparable results are obtained. In each instance, the acetyl tributyl citrate lubricated container stock exhibits better wetting properties and the hardened organic coating films applied thereto are more adherent than when dioctyl sebacate is the lubricant.

We claim:

[1. A metalic container stock having a thin substantially uniform film of a citric acid ester lubricant on at least one surface area thereof, the said citric acid ester lubricant consisting essentially of at least one citric acid ester of an alcohol containing 1-10 carbon atoms and being present in an amount of about 0.05-1.0 gram for each 62,720 square inches of lubricated surface area.]

[2. The lubricated container stock of claim 1 wherein the citric acid ester lubricant is present in an amount of about 0.15-0.40 gram for each 62,720 square inches of lubricated surface area.]

[3. The lubricated container stock of claim 1 wherein the container stock is selected from the group consisting tinplate, blackplate, blackplate having a chromium-containing coating thereon, and metallic aluminum of container stock gauge.]

[4. The lubricated container stock of claim 3 wherein the container stock is blackplate.]

[5. The lubricated container stock of claim 3 wherein the container stock is blackplate having a chromium-containing coating thereon.]

[6. The lubricated container stock of claim 3 wherein the container stock is metallic aluminum of container stock gauge.]

[7. The lubricated container stock of claim 3 wherein the container stock is tinplate.]

[8. The lubricated container stock of claim 1 wherein the said film consists essentially of at least one citric acid ester lubricant having the structural formula:

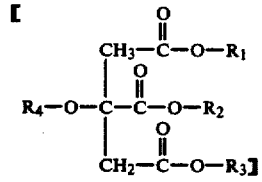

wherein $R_1$, $R_2$ and $R_3$ are individually selected from the group consisting of hydrogen and alcoholic residua containing 1-10 carbon atoms, $R_4$ is selected from the group consisting of hydrogen and carboxylic acid radicals containing 1-10 carbon atoms, and at least one of $R_1$, $R_2$ and $R_3$ is an alcoholic residue.]

[9. The lubricated container stock of claim 8 wherein $R_1$, $R_2$ and $R_3$ are alcoholic residua containing 1-4 carbon atoms.]

[10. The lubricated container stock of claim 8 wherein $R_1$, $R_2$ and $R_3$ are alcoholic residua containing 1-4 carbon atoms, and $R_4$ is selected from the group consisting of hydrogen and carboxylic acid radicals containing 1-4 carbon atoms.]

[11. The lubricated container stock of claim 8 wherein the citric acid ester lubricant consists essentially of at least one substance selected from the group consisting of triethyl citrate, acetyl triethyl citrate, tributyl citrate, acetyl tributyl citrate, acetyl tri-2-ethylhexyl citrate, and admixtures thereof.]

[12. The lubricated container stack of claim 8 wherein the citric acid ester lubricant consists essentially of acetyl tributyl citrate.]

[13. The lubricated container stack of claim 8 wherein the citric acid ester consists essentially of acetyl tributyl citrate and is applied in an amount of about 0.15-0.40 gram for each 62,720 square inches of lubricated surface area.]

[14. The lubricated container stock of claim 3 wherein the container stock is tinplate and a film comprising at least one citric acid ester lubricant having the structural formula:

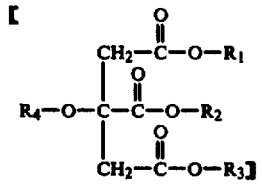

wherein $R_1$, $R_2$ and $R_3$ are individually selected from the group consisting of hydrogen and alcoholic residua containing 1-10 carbon atoms, $R_4$ is selected from the group consisting of hydrogen and carboxylic acid radicals containing 1–10 carbon atoms, and at least one of $R_1$, $R_2$ and $R_3$ is an alcoholic residue.]

[15. The lubricated container stock of claim 14 wherein the citric acid ester lubricant is present in an amount of about 0.15–0.40 gram for each 62,720 square inches of lubricated surface area.]

[16. The lubricated container stock of claim 14 wherein $R_1$, $R_2$ and $R_3$ are alcoholic residua containing 1–4 carbon atoms.]

[17. The lubricated container stock of claim 14 wherein $R_1$, $R_2$ and $R_3$ are alcoholic residua containing 1–4 carbon atoms, and $R_4$ is selected from the group consisting of hydrogen and carboxylic acid radicals containing 1–4 carbon atoms.]

[18. The lubricated container stock of claim 14 wherein the citric acid ester lubricant comprises at least one substance selected from the group consisting of triethyl citrate, acetyl triethyl citrate, tributyl citrate, acetyl tributyl citrate, acetyl tri-2-ethylhexyl citrate and admixtures thereof.]

[19. The lubricated container stock of claim 14 wherein the citric acid ester lubricant comprises acetyl tributyl citrate.]

[20. The lubricated container stock of claim 19 wherein the citric acid ester lubricant is present in an amount of about 0.15–0.40 gram for each 62,720 square inches of lubricated surface area.]

21. In a method of applying an organic coating to metallic container stock wherein a layer of an initially fluid organic varnish, lacquer or enamel for the container stock is applied to at least a portion of the surface area of the container stock and thereafter the layer of the initially fluid organic varnish, lacquer or enamel is hardened to form the said organic coating, the improvement which comprises improving the wettability of the said surface area of the container stock by the initially fluid organic varnish, lacquer or enamel by [employing thereon as the said lubricant a substantially uniform film] *applying to the surface area of the container stock only a substantially uniform film of a lubricant* consisting essentially of a citric acid ester of an alcohol containing 1–10 carbon atoms, the citric acid ester being present in an amount of about 0.05–1.0 gram for each 62,720 square inches of lubricated surface area of the container stock.

22. The method of claim 21 wherein the citric acid ester lubricant is present in an amount of about 0.15–0.40 gram for each 62,720 square inches of lubricated surface area.

23. The method of claim 21 wherein the metallic container stock is selected from the group consisting of tinplate, blackplate, blackplate having a chromium-containing coating thereon, and metallic aluminum of container stock gauge.

24. The method of claim 23 wherein the container stock is blackplate.

25. The method of claim 23 wherein the container stock is blackplate having a chromium-containing coating thereon.

26. The method of claim 23 wherein the container stock is metallic aluminum of container stock gauge.

27. The method of claim 23 wherein the container stock is tinplate.

28. The method of claim 21 wherein the citric acid ester lubricant has the structural formula:

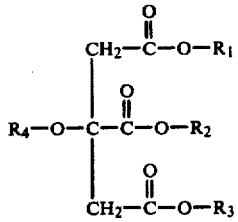

wherein $R_1$, $R_2$ and $R_3$ are individually selected from the group consisting of hydrogen and alcoholic residua containing 1–10 carbon atoms, $R_4$ is selected from the group consisting of hydroben and carboxylic acid radicals containing 1–10 carbon atoms, and at least one of $R_1$, $R_2$ and $R_3$ is an alcoholic residue.

29. The method of claim 28 wherein $R_1$, $R_2$ and $R_3$ are alcoholic residua containing 1–4 carbon atoms.

30. The coated metallic container stock prepared by the method of claim 21.

31. The method of claim 21 wherein the citric acid ester lubricant [comprises] *consists of* at least one substance selected from the group consisting of triethyl citrate, acetyl triethyl citrate, tributyl citrate, acetyl tributyl citrate, acetyl tri-2-ethylhexyl citrate, and admixtures thereof.

32. The method of claim 21 wherein the citric acid ester lubricant [comprises] *consists of* acetyl tributyl citrate.

33. The method of claim 21 wherein the citric acid ester [comprises] *consists of* acetyl tributyl citrate and is applied in an amount of about 0.15–0.40 gram for each 62,720 square inches of lubricated surface area.

34. The method of claim 21 wherein the citric acid ester is of an alcohol containing 1–4 carbon atoms.

35. The method of claim 23 wherein the container stock is tinplate and the citric acid ester lubricant has the structural formula:

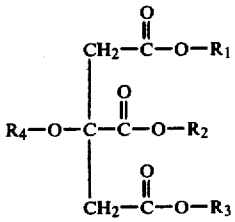

wherein $R_1$, $R_2$ and $R_3$ are individually selected from the group consisting of hydrogen and alcoholic residua containing 1–10 carbon atoms, $R_4$ is selected from the group consisting of hydrogen and carboxylic acid radicals containing 1–10 carbon atoms, and at least one of $R_1$, $R_2$ and $R_3$ is an alcoholic residue.

36. The method of claim 35 wherein the citric acid ester lubricant is present in an amount of about 0.15–0.40 gram for each 62,720 square inches of lubricated surface area.

37. The method of claim 35 wherein $R_1$, $R_2$ and $R_3$ are alcoholic residua containing 1–4 carbon atoms.

38. The method of claim 35 wherein $R_1$, $R_2$ and $R_3$ are alcoholic residua containing 1–4 carbon atoms, and $R_4$ is selected from the group consisting of hydrogen and carboxylic acid radicals containing 1–4 carbon atoms.

39. The method of claim 35 wherein the citric acid ester lubricant comprises at least one substance selected from the group consisting of triethyl citrate, acetyl triethyl citrate, tributyl citrate, acetyl tributyl citrate, acetyl tri-2-ethylhexyl citrate, and admixtures thereof.

40. The method of claim 35 wherein the citric acid ester lubricant comprises acetyl tributyl citrate.

* * * * *